US011681204B2

(12) United States Patent
Huang et al.

(10) Patent No.: US 11,681,204 B2
(45) Date of Patent: Jun. 20, 2023

(54) CAMERA ELECTRICAL MECHANICAL PRIVACY SHUTTER WITH SHUTTER LOCK MECHANISM

(71) Applicant: Dell Products L.P., Round Rock, TX (US)

(72) Inventors: Shao-Che Huang, Shilin Dist. (TW); Yao-Hsien Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/383,778

(22) Filed: Jul. 23, 2021

(65) Prior Publication Data

US 2023/0024718 A1 Jan. 26, 2023

(51) Int. Cl.
*G03B 11/04* (2021.01)
*H04N 23/55* (2023.01)

(52) U.S. Cl.
CPC .......... *G03B 11/043* (2013.01); *H04N 23/55* (2023.01)

(58) Field of Classification Search
CPC ............................ G03B 11/043; H04M 1/0264
See application file for complete search history.

(56) References Cited

U.S. PATENT DOCUMENTS

| 5,903,791 A * | 5/1999 | Okada ................... G03B 17/02 396/543 |
| 7,548,255 B2 * | 6/2009 | Bear .................. H04N 5/23203 348/207.11 |
| 11,226,466 B2 * | 1/2022 | Wang ................... G03B 11/043 |

* cited by examiner

*Primary Examiner* — Leon W Rhodes, Jr.
(74) *Attorney, Agent, or Firm* — Terrile, Cannatti & Chambers; Stephen A. Terrile (57) ABSTRACT

A webcam, a privacy shutter mechanism, and method of electrically activating the privacy mechanism are described. The privacy shutter is part of a webcam and includes privacy shutter mechanism chassis; an electrically activated coil mechanism mounted on privacy shutter mechanism chassis; a locking mechanism mounted on the electrically activated coil mechanism; a shutter plane with a shutter that locks with the locking mechanism, wherein the electrically activated coil mechanism moves the shutter plane in place to open or close the shutter; a fixture having a shutter opening attached to the privacy shutter mechanism chassis; and a shutter locking mechanism that is electrically activated to lock or unlock when the shutter is close or open.

16 Claims, 7 Drawing Sheets

CAMERA ELECTRICAL MECHANICAL PRIVACY SHUTTER WITH SHUTTER LOCK MECHANISM

BACKGROUND OF THE INVENTION

Field of the Invention

The present invention relates to the hinge areas of computing devices. More specifically, embodiments of the invention provide for an electrical activated mechanical privacy shutter for a webcam of computing device.

Description of the Related Art

The use of video conferencing has been found to be a convenient and useful business tool that allows people in different locations throughout the world to meet and collaborate with one another. To facilitate video conferencing through computing devices, such as laptop computers, webcams are used. In many cases, a webcam is integrated as part of a laptop computer.

Webcams provide valuable functionality to users; however, there can be potential security and privacy issues involved with webcams. For example, webcams can be hacked and activated when not in use by a user. In other cases, a webcam may be accidently left on by the user, exposing the user to unwanted video streaming and comprising the user's privacy.

Solutions can include a simple physical covering over the shutter that is manually put in place. This can be an awkward solution that requires the user to remember to put the cover in place and remove the cover when the webcam is desired to be used. Because laptop computers are mobile devices that are continuously moved, the cover to the shutter can be displaced or opened during movement of the laptop computer. Other shutter mechanisms that are not secure nor robust can also be dislodged and opened if a laptop computer dropped or vigorously moved.

SUMMARY OF THE INVENTION

A webcam, a privacy shutter mechanism, and method of electrically activating the privacy mechanism are described. The privacy shutter is part of a webcam and includes privacy shutter mechanism chassis; an electrically activated coil mechanism mounted on privacy shutter mechanism chassis; a locking mechanism mounted on the electrically activated coil mechanism; a shutter plane with a shutter that locks with the locking mechanism, wherein the electrically activated coil mechanism moves the shutter plane in place to open or close the shutter; a fixture having a shutter opening attached to the privacy shutter mechanism chassis; and a shutter locking mechanism that is electrically activated to lock or unlock when the shutter is close or open.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein provide for an electrical activated mechanical privacy shutter or shutter mechanism for a webcam that includes a lock mechanism. The lock mechanism includes an electrically activate lock pin. In certain embodiment, the lock pin moves up and down to secure a shutter. In certain embodiments, the lock pin is rotated to secure the shutter.

Figure 1:
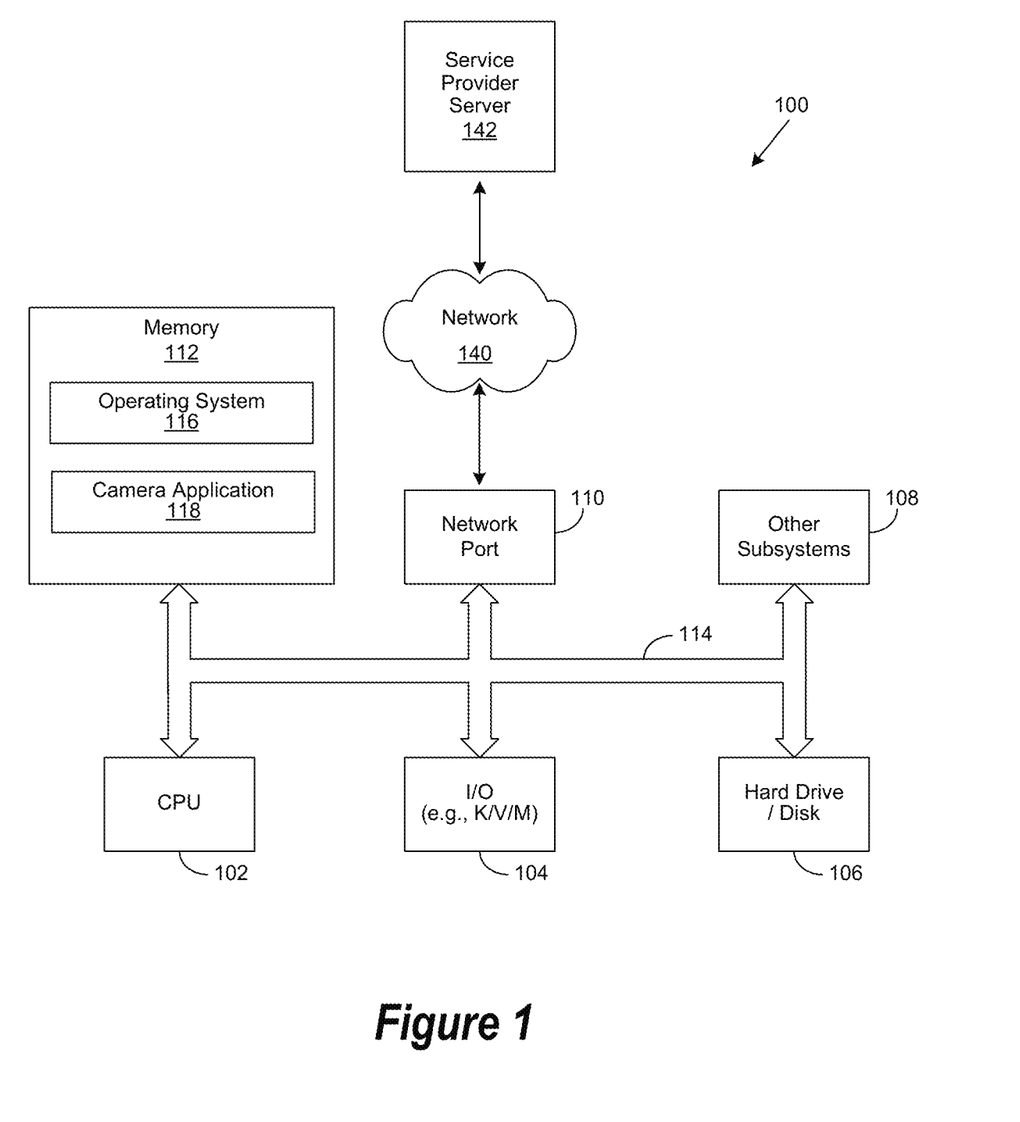
FIG. 1 illustrates an information handling system that can be used to implement the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes an operating system (OS) 116 and camera application 118. A webcam as further described herein can be included as I/O device 104 of the information handling system 100. The electrical activated mechanical privacy shutter described herein can be part of the webcam. In certain implementations, the camera application 118 may be used to activate the webcam and the mechanical privacy shutter or shutter mechanism. Implementations can provide for function keys of the information handling system, such as "F4" or "F9" to control (i.e., turn on or off) the mechanical privacy shutter or shutter mechanism. Embodiments provide for function keys to be controlled by hardware on the information handling system.

Figure 2:
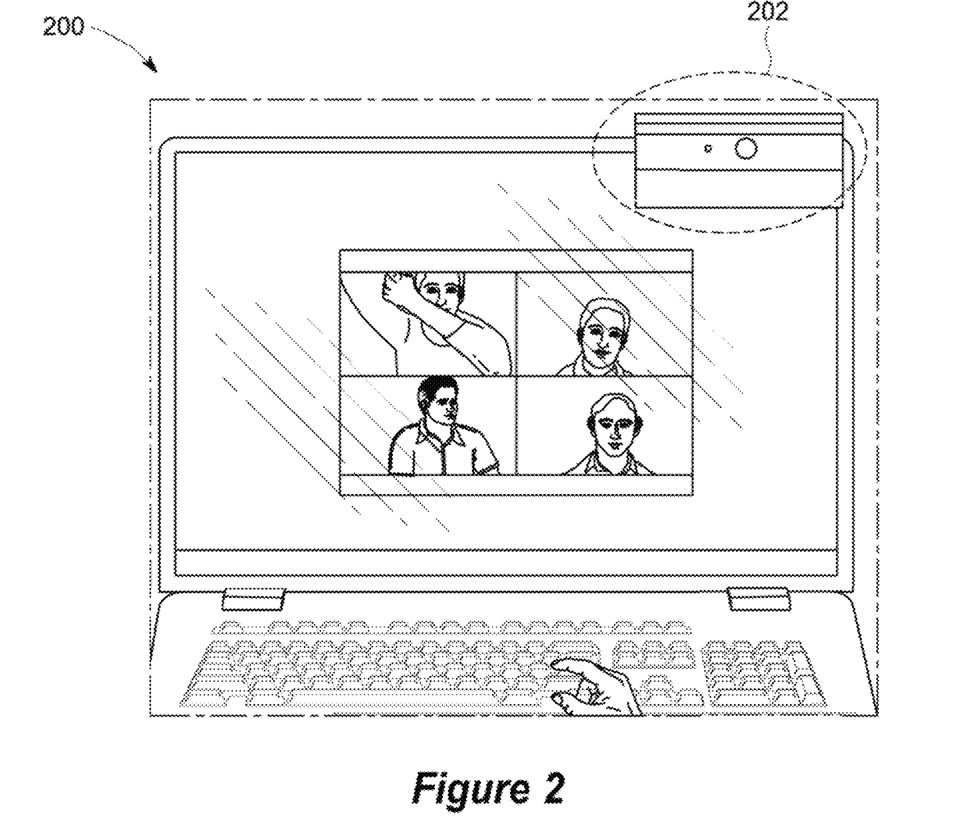
FIG. 2 illustrates a laptop computer with a webcam.

FIG. 2 shows a laptop computer with a webcam. The laptop computer 200 can be implemented as an information handling system 100 as described in FIG. 1. Embodiments provide for the laptop computer 200 to include a webcam 202 as an I/O device 104. Implementations provide for the webcam 202 to include the mechanical privacy shutter or shutter mechanism as described herein.

Figure 3:
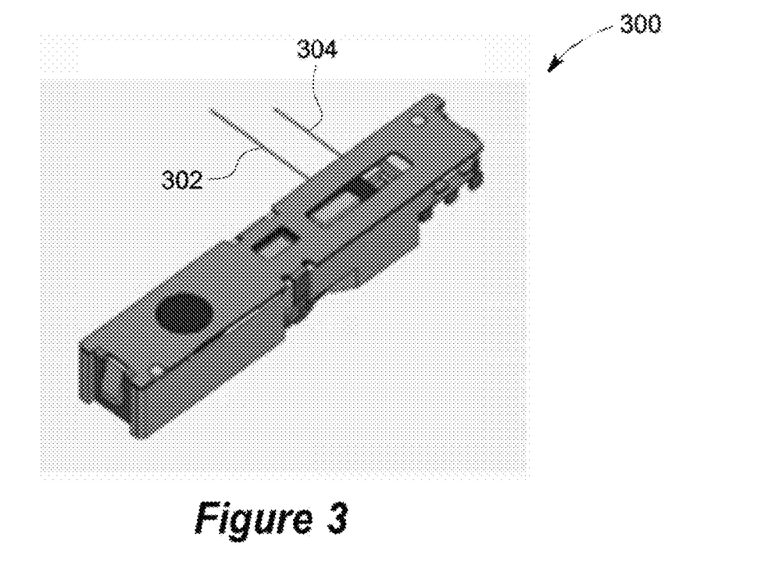
FIG. 3 illustrates an electrically activated mechanical privacy shutter mechanism.

FIG. 3 shows an electrically activated mechanical privacy shutter mechanism. Implementations provide for privacy shutter mechanism 300 to be part of the webcam 202. Electrical connections to 302 and 304 are part of an information handling system 100 or laptop computer 200. Implementations provide for electrical input from the information handling system 100 or laptop computer 200 to a activate the privacy shutter mechanism 300. As discussed, activation of the privacy shutter mechanism 300 can be through camera application and/or a function key (e.g., "F4" or "F9"). Implementations can provide that the privacy shutter mechanism 300 can only be open when electrically input is provided. Therefore, for example if the laptop computer is powered off, the privacy shutter mechanism 300 is closed and the webcam 200 is not exposed/operational.

Figure 4:
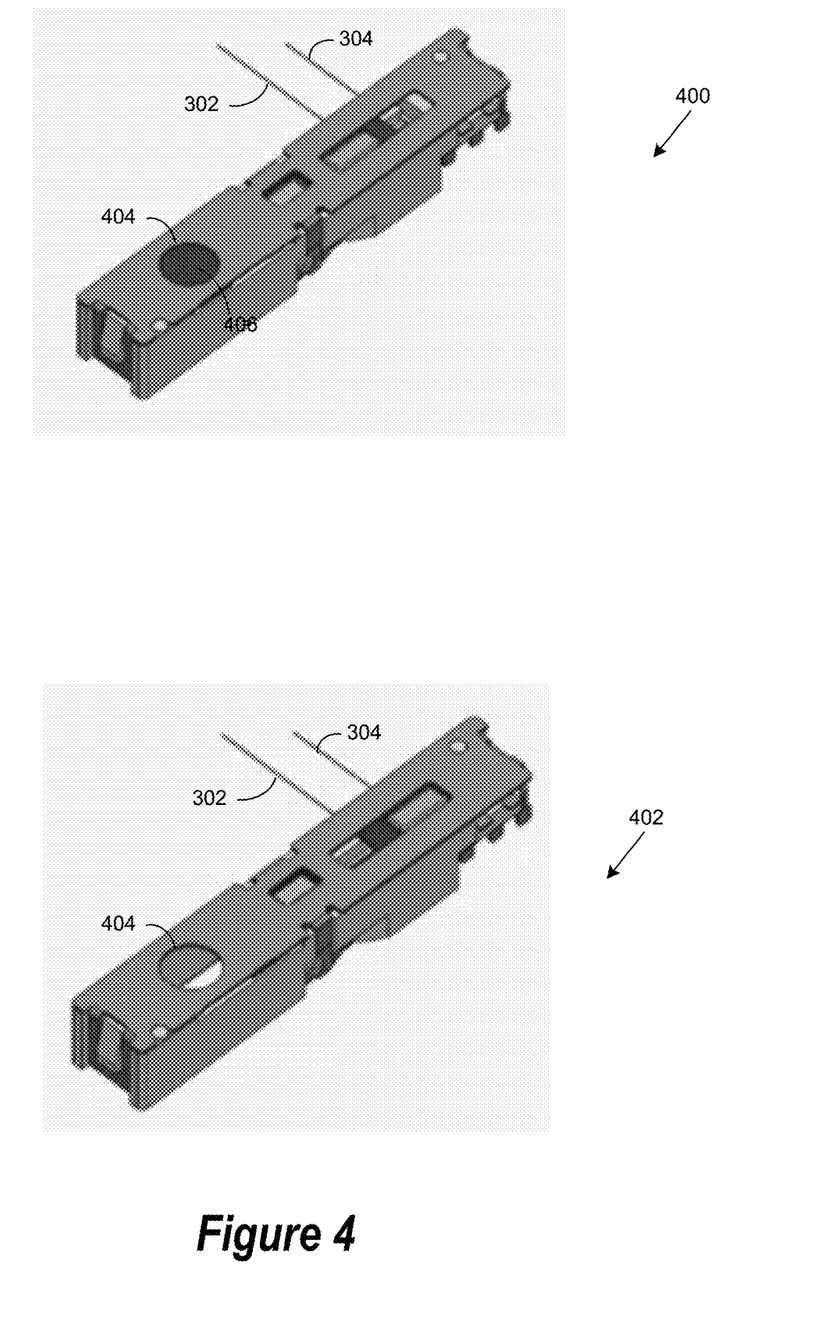
FIG. 4 illustrates an electrically activated mechanical privacy shutter mechanism in a closed position and an open position.

FIG. 4 shows an electrically activated mechanical privacy shutter mechanism in a closed position and an open position. 400 shows the privacy shutter mechanism 300 in a closed position. The privacy shutter mechanism 300 includes a shutter 404 that is placed over a shutter opening 406 when during the closed position 400. The shutter opening 406 is used to shut off or expose the webcam 202. 402 shows the privacy shutter mechanism 300 in an open position exposing the webcam 202.

Figure 5:
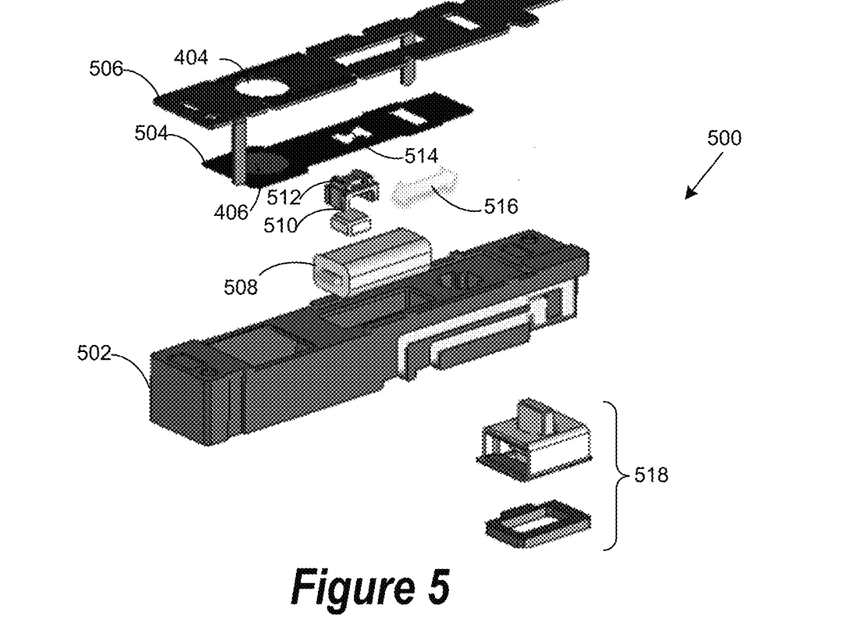
FIG. 5 illustrates an expanded view of electrically activated mechanical privacy shutter mechanism with a locker structure that activates in vertically.

FIG. 5 shows an expanded view of electrically activated mechanical privacy shutter mechanism with a locker structure that activates in vertically. In various embodiments, the electrically activated mechanical privacy shutter mechanism 500 provides for locking the shutter in an up and down matter as further described herein. Implementations provide for the electrically activated mechanical privacy shutter mechanism 500 to include a privacy shutter mechanism chassis 502. The shutter 406 described earlier is part of a shutter plane 504. A fixture 506 includes the shutter opening 404. The fixture 506 is affixed to the privacy shutter mechanism chassis 502.

Implementations provide for a coil mechanism 508 that can be electrically activated to move the shutter plane 506 and shutter to 406 into a close position and an open position. A locking mechanism 510 can be mounted to the coil mechanism 508. The locking mechanism 510 includes a pin 512 that inserts and secures to an opening 514 of the shutter plane 506. Therefore, when the coil mechanism 508 is activated (e.g., electrically activated through information handling system 100 or laptop computer 200), the shutter plane 506 and shutter 404 move in direction 516 to open and close the shutter opening 404.

Implementations provide for the electrically activated mechanical privacy shutter mechanism 500 to include a vertical locking mechanism 518. The vertical locking mechanism 518 includes a locking pin that locks in the shutter plane 506 and shutter 404 in a close position or open position. The vertical locking mechanism 518 is further describe herein.

Figure 6:
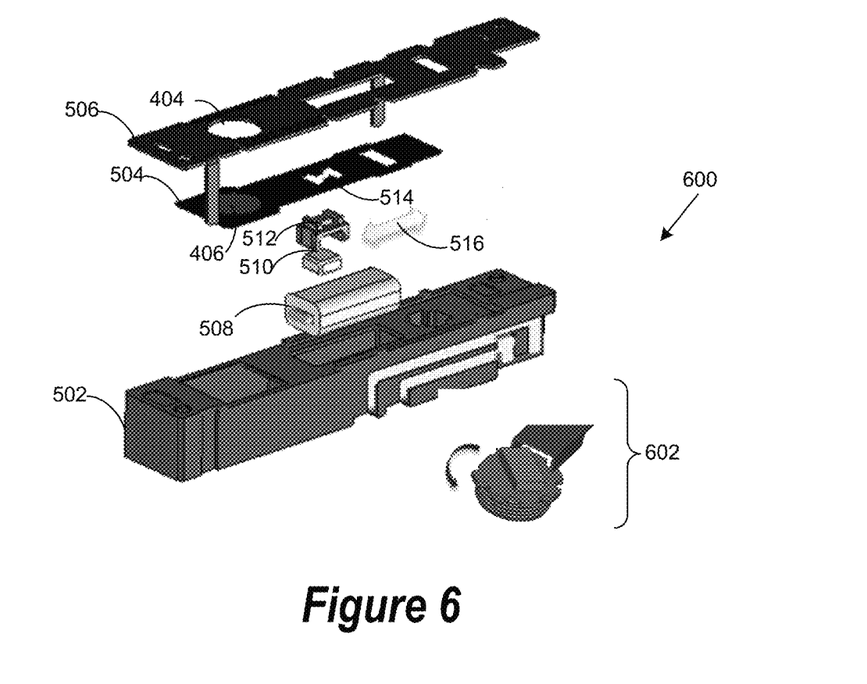
FIG. 6 illustrates an expanded view of electrically activated mechanical privacy shutter mechanism with a locker structure that activates rotationally.

FIG. 6 shows an expanded view of electrically activated mechanical privacy shutter mechanism with a locker structure that activates rotationally. In various embodiments, the electrically activated mechanical privacy shutter mechanism 600 provides for locking the shutter in a rotational matter as further described herein. Implementations provide for the electrically activated mechanical privacy shutter mechanism 600 to include a rotational locking mechanism 602. The rotational locking mechanism 602 includes a locking pin that locks in the shutter plane 506 and shutter 404 in a close position or open position. The rotational locking mechanism 602 is further describe herein.

Figure 7:
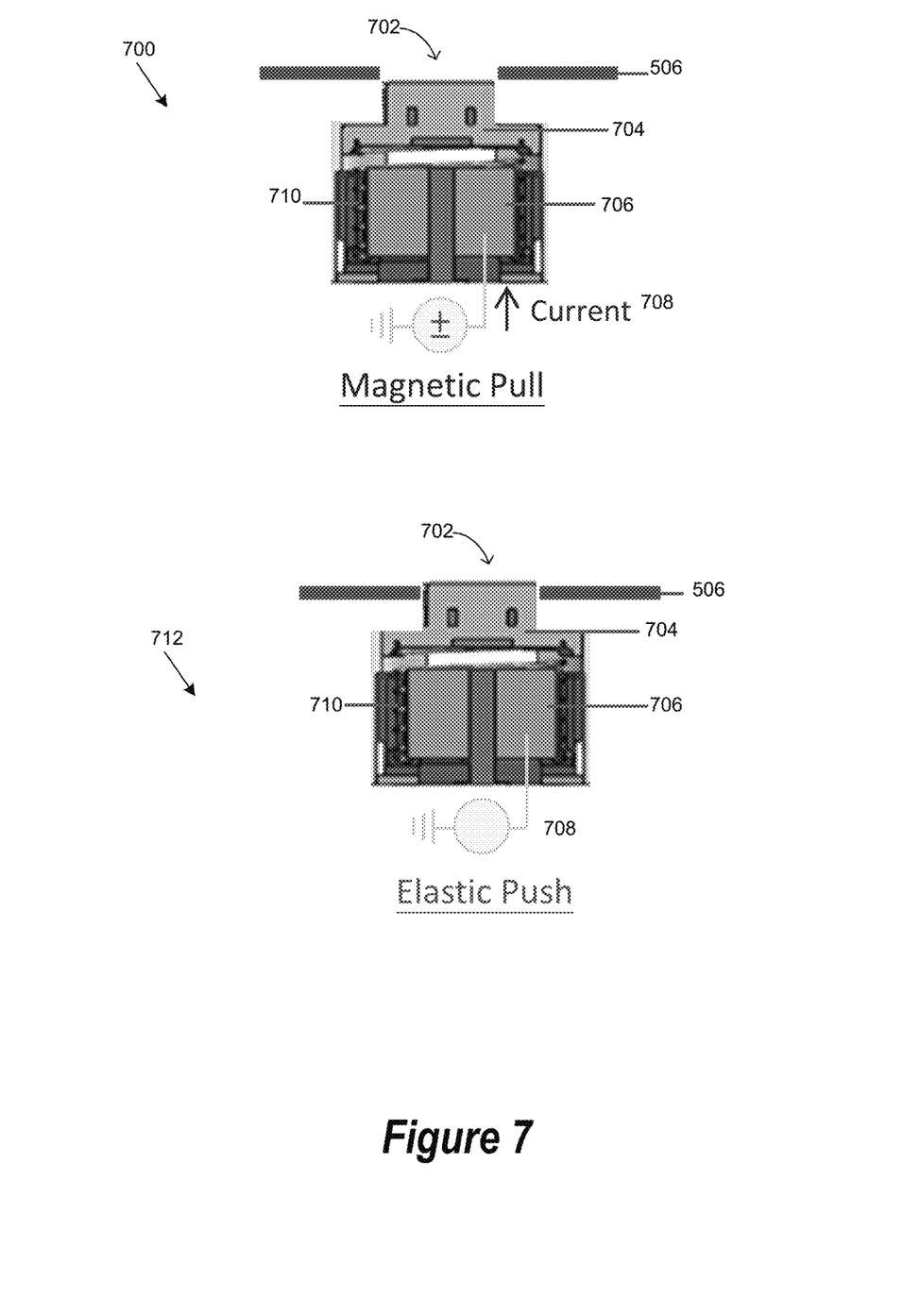
FIG. 7 illustrates an operation of a locker structure that activates vertically.

FIG. 7 shows operation of a locker structure that activates vertically. 700 is a view of an unlock position for the vertical locking mechanism 518. Implementations provide for locking opening 702 on the shutter plane 506. A locking pin 704 is provided that locks into the locking opening 702. A coil 706 is electrically activated by current 708. When activated, the coil 706 initiations a spring 710 that pulls (i.e., magnetic pull) the locking pin 704 to release the shutter plane 506 and open the shutter 404. Therefore, only when current is applied is the unlock position 700 activated. Current 808 being activated when information handling system 100 or laptop computer 200 is turned on, or when a user actively initiates the electrically activated mechanical privacy shutter mechanism 500.

712 is a view of a lock position for the vertical locking mechanism 518. Without current 708 to coil 708, the spring 710 is allowed to decompress and to push locking pin 704 into the locking opening 702 and to close the shutter 404. Therefore, when Current 408 being activated when information handling system 100 or laptop computer 200 is turned off the shutter 404 is closed. A user may also actively initiate shutting current 708 to lock the vertical locking mechanism 518.

Figure 8:
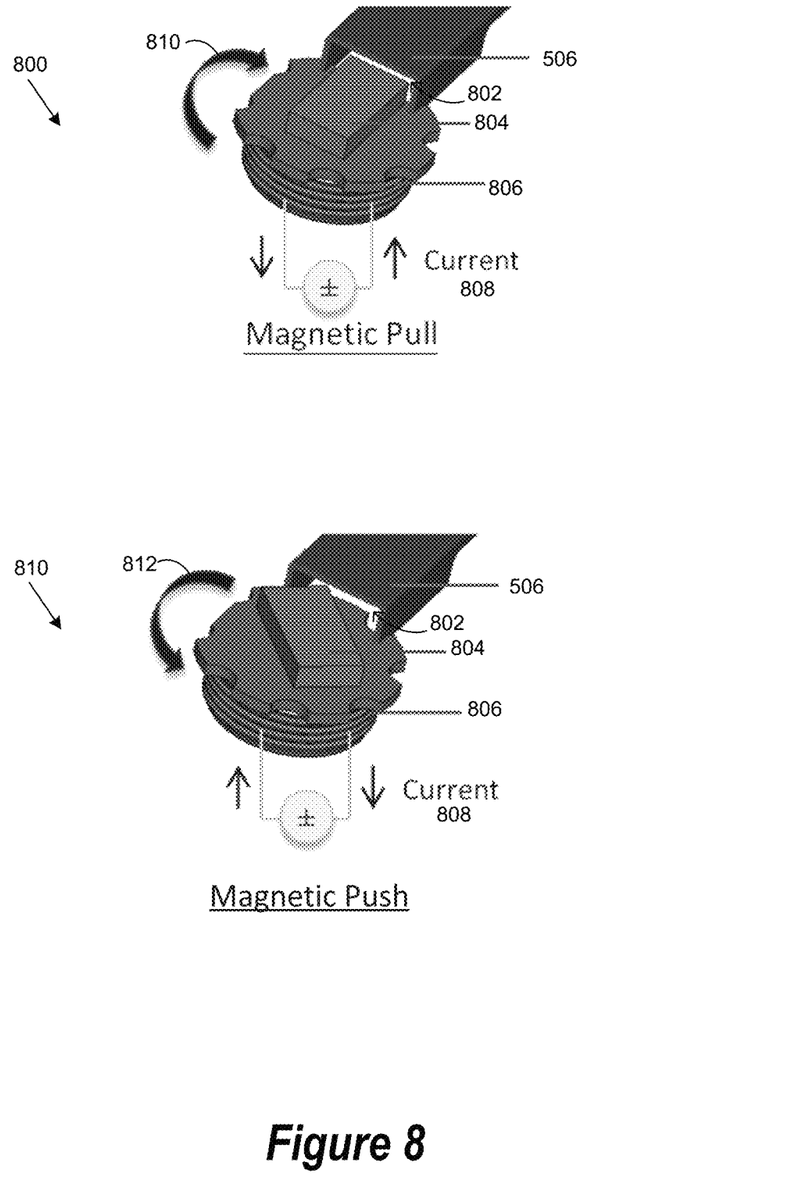
FIG. 8 illustrates an operation of a locker structure that activates rotationally.

FIG. 8 shows operation of a locker structure that activates rotationally. 800 is a view of an unlock position for the rotational locking mechanism 602. Implementations provide for locking opening 802 on the shutter plane 506. A locking pin 804 is provided that slides into the locking opening 802. A coil 806 is electrically activated by current 808. When current 808 is activated to provide current as to a particular direction, the coil 806 and locking pin 804 are rotated in direction 810 (magnetic pull) to allow locking pin 804 to slide into locking opening 802, and release shutter plane 506 and open shutter 404. The current 808 can be activated in the direction to unlock, when information handling system 100 or laptop computer 200 is turned on, or when a user actively initiates the electrically activated mechanical privacy shutter mechanism 500.

812 is a view of a lock position for the rotational locking mechanism 602. When current 808 is activated to provide current in a different direction than in the unlock position described in 800, the coil 806 and locking pin 804 are rotated in direction 814, and the locking pin 804 is prevented from sliding into the locking opening 802. The shutter plane 506 is locked and the shutter is closed. The current 808 can be activated in the direction to lock when information handling system 100 or laptop computer 200 is turned off, or when a user actively initiates the electrically activated mechanical privacy shutter mechanism 500.

Figure 9:
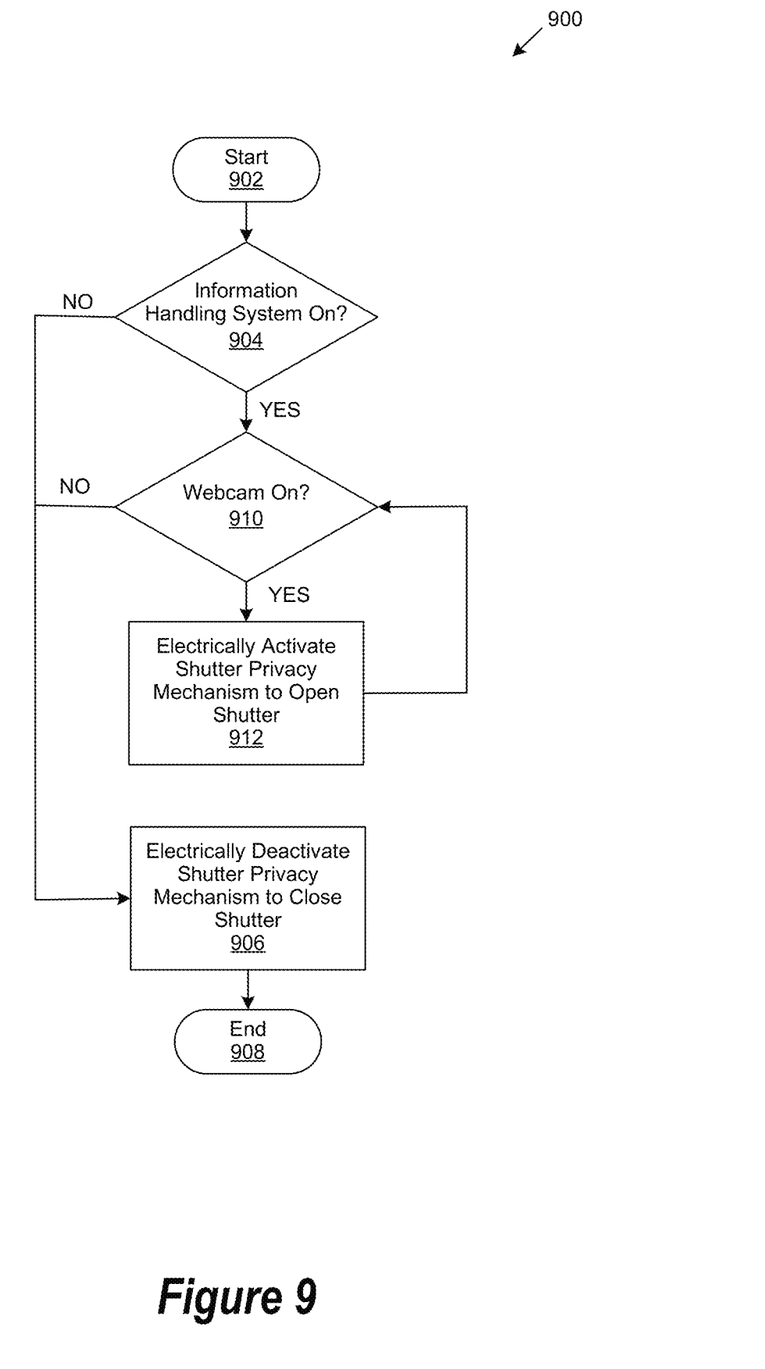
FIG. 9 is generalized flowchart for activating a mechanical privacy shutter for a webcam of computing device.

FIG. 9 is a generalized flowchart 900 for activating mechanical privacy shutter for a webcam of computing device. In particular the privacy shutter mechanism 300 in which a locking mechanism, such as vertical locking mechanism 518 or rotational locking mechanism 602 is used to open or close shutter 404. The order in which the method is described is not intended to be construed as a limitation, and any number of the described method blocks may be combined in any order to implement the method, or alternate method.

At step 904, a determination is performed as to whether the information handling system 100 or laptop computer 200 is "on." If the information handling system 100 or laptop computer 200 is not "on", then following the "NO" branch of step 904, at step 906, the privacy shutter mechanism 300 is deactivated. The deactivation can be turning off power to a coil 706 which releases spring 710 that places locking pin 704 in place to close the shutter 404. In other implementations, deactivation can be directing current to rotationally turn a locking pin 804 in place to close the shutter 404. At step 908, the process 900 ends.

If the information handling system 100 or laptop computer 200 is "on", then following the "YES" branch of step 904, at step 910, a determination is made if a webcam, such as the webcam 202 is to be turned "on." The webcam 202 can be turned on by an application, such as camera application 118, and/or hardware connected function keys (e.g., function key "F4" or "F9"). If the webcam 202 is to be turned "ON", then following the "YES" branch of step 910, at step 912, the privacy shutter 300 is activated. The deactivation can be turning on power to a coil 706 which compresses spring 710 to depress locking pin 704 in place to open the shutter 404. In other implementations, activation can be directing current to rotationally turn a locking pin 804 in place to close the shutter 404.

Step 910 follows. If the webcam 202 is to not to be turned "ON", then following the "NO" branch of step 910, step 906 is performed. At step 908, the process 900 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A privacy shutter mechanism for a webcam comprising:
   privacy shutter mechanism chassis;
   an electrically activated coil mechanism mounted on the privacy shutter mechanism chassis;
   a shutter locking mechanism mounted on the electrically activated coil mechanism comprising of a locking pin structure, and electrically activated to lock or unlock when a shutter is closed or open;
   a shutter plate with the shutter that locks with the shutter locking mechanism by the locking pin structure configured to extend along a first direction of the shutter plate when the shutter plate is able to move and to extend in a second direction other than parallel to the first direction when the shutter plate is not able to move, wherein the electrically activated coil mechanism moves the shutter plane in place to open or close the shutter; and
   a fixture having a shutter opening attached to the privacy shutter mechanism chassis.

2. The privacy shutter mechanism of claim 1, wherein the shutter locking mechanism is a rotationally operated shutter locking mechanism.

3. The privacy shutter mechanism of claim 2, wherein a coil on the rotationally operated shutter locking mechanism rotates a locking pin to slide into an opening when the shutter is open or rotates the locking pin to prevent from sliding into the opening when the shutter is open.

4. The privacy shutter mechanism of claim 1, wherein activation or deactivation of the privacy shutter mechanism is performed through an application and/or function keys of an information handling system that includes the web cam.

5. The privacy shutter mechanism of claim 1, wherein the webcam is integrated as in a laptop computer.

6. A webcam comprising:
   privacy shutter mechanism chassis;
   an electrically activated coil mechanism mounted on the privacy shutter mechanism chassis;
   a shutter locking mechanism mounted on the electrically activated coil mechanism comprising of a locking pin structure, and electrically activated to lock or unlock when a shutter is closed or open;
   a shutter plate with the shutter that locks with the shutter locking mechanism by the locking pin structure configured to extend along a first direction of the shutter plate when the shutter plate is able to move and to extend in a second direction other than parallel to the first direction when the shutter plate is not able to move, wherein the electrically activated coil mechanism moves the shutter plane in place to open or close the shutter; and
   a fixture having a shutter opening attached to the privacy shutter mechanism chassis.

7. The webcam of claim 6, wherein the shutter locking mechanism is a rotationally operated shutter locking mechanism.

8. The webcam of claim 7, wherein a coil on the rotationally operated shutter locking mechanism rotates a locking pin to slide into an opening when the shutter is open or rotates the locking pin to prevent from sliding into the opening when the shutter is open.

9. The webcam of claim 6, wherein activation or deactivation of the privacy shutter mechanism is performed through an application and/or function keys of an information handling system that includes the webcam.

10. The webcam of claim 6, wherein the webcam is integrated as in a laptop computer.

11. A method of activating mechanical privacy shutter for a webcam of computing device comprising:
    electrically activating a privacy shutter mechanism comprising:
      an electrically activated coil mechanism mounted on the privacy shutter mechanism chassis;
      a shutter locking mechanism mounted on the electrically activated coil mechanism comprising of a locking pin structure, and electrically activated to lock or unlock when a shutter is closed or open;
      a shutter plate with the shutter that locks with the shutter locking mechanism by the locking pin structure configured to extend along a first direction of the shutter plate when the shutter plate is able to move and to extend in a second direction other than parallel to the first direction when the shutter plate is not able to move,
    wherein the electrically activated coil mechanism moves the shutter plane in place to open or close the shutter; and
      a fixture having a shutter opening attached to the privacy shutter mechanism chassis.

12. The method of claim 11, wherein the shutter locking mechanism is a vertically operated shutter locking mechanism.

13. The method of claim 11, wherein the shutter locking mechanism is a rotationally operated shutter locking mechanism.

14. The method of claim 11, wherein the privacy shutter mechanism is deactivated when a laptop computer is not on.

15. The method of claim 11, wherein the privacy shutter mechanism is deactivated when the webcam is determined not to be on.

16. The method of claim 11, wherein activation of the privacy shutter mechanism is through an application and/or hardware connected function keys of the computing device.

* * * * *